(12) United States Patent
Graef

(10) Patent No.: US 9,682,655 B2
(45) Date of Patent: Jun. 20, 2017

(54) METHOD AND DEVICE FOR OPERATING A VEHICLE

(71) Applicant: Bayerische Motoren Werke Aktiengesellschaft, Munich (DE)

(72) Inventor: Michael Graef, Graefelfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 345 days.

(21) Appl. No.: 14/629,188

(22) Filed: Feb. 23, 2015

(65) Prior Publication Data

US 2015/0175073 A1 Jun. 25, 2015

Related U.S. Application Data

(63) Continuation of application No. PCT/EP2013/066046, filed on Jul. 31, 2013.

(30) Foreign Application Priority Data

Aug. 23, 2012 (DE) ........................ 10 2012 215 026

(51) Int. Cl.
*H04N 13/02* (2006.01)
*B60R 1/00* (2006.01)
(Continued)

(52) U.S. Cl.
CPC ................ *B60R 1/00* (2013.01); *G06T 5/005* (2013.01); *G06T 7/74* (2017.01);
(Continued)

(58) Field of Classification Search
CPC . G06T 5/005; G06T 2207/30252; G06T 7/74; G06T 2207/10012;
(Continued)

(56) References Cited

U.S. PATENT DOCUMENTS

| 2003/0091228 A1 | 5/2003 | Nagaoka et al. |
| 2004/0169617 A1 | 9/2004 | Yelton et al. |

(Continued)

FOREIGN PATENT DOCUMENTS

| DE | 10 2006 003 538 B3 | 7/2007 |
| DE | 102 51 880 B4 | 1/2009 |

(Continued)

OTHER PUBLICATIONS

"Foreground Rejection for Parallax Removal in Video Sequence Stitching", Panarungsun, et al., 2011 International Symposium on Intelligent Signal Processing and Communication Systems (ISPACS) Dec. 7-9, 2011, (Six (6) pages).

(Continued)

*Primary Examiner* — Sath V Perungavoor
*Assistant Examiner* — Peet Dhillon
(74) *Attorney, Agent, or Firm* — Crowell & Moring LLP

(57) ABSTRACT

In a method or corresponding device for operating a vehicle equipped with a first and a second camera configured to capture a surrounding region around the vehicle, the cameras respectively capture an individual image of a first field of view and a second field of view. The fields of view overlap in an overlapping region. An object correction is performed as a function of image data of the individual images, in which object correction a distance of objects imaged in the second individual image is respectively determined from a predetermined reference point. An angle of the respective object is respectively determined in relation to a predetermined reference axis. Whether the respective object is situated in the overlapping region is determined on the basis of the determined angle and distance of the respective object. Should this be the case, the respective object is removed from the second individual image. Subsequently, an overall image is determined after performing the object (Continued)

correction, which overall image is composed as a function of the first individual image and the second individual image.

12 Claims, 5 Drawing Sheets

(51) Int. Cl.
*G06T 5/00* (2006.01)
*G06T 7/73* (2017.01)

(52) U.S. Cl.
CPC ... *B60R 2300/105* (2013.01); *B60R 2300/107* (2013.01); *B60R 2300/303* (2013.01); *B60R 2300/50* (2013.01); *B60R 2300/602* (2013.01); *B60R 2300/802* (2013.01); *B60R 2300/8093* (2013.01); *G06T 2207/10012* (2013.01); *G06T 2207/10028* (2013.01); *G06T 2207/20221* (2013.01); *G06T 2207/30252* (2013.01)

(58) Field of Classification Search
CPC . G06T 2207/10028; G06T 2207/20221; B60R 1/00; B60R 2300/105; B60R 2300/107; B60R 2300/303; B60R 2300/50; B60R 2300/602; B60R 2300/802; B60R 2300/8093
See application file for complete search history.

(56) References Cited

U.S. PATENT DOCUMENTS

| | | | |
|---|---|---|---|
| 2005/0062615 A1* | 3/2005 | Braeuchle | B60K 31/0008 340/903 |
| 2008/0075391 A1 | 3/2008 | Van Den Heuvel et al. | |
| 2008/0253685 A1 | 10/2008 | Kuranov et al. | |
| 2009/0022423 A1 | 1/2009 | Ehlgen et al. | |
| 2011/0115615 A1* | 5/2011 | Luo | B60R 1/00 340/436 |
| 2013/0107052 A1 | 5/2013 | Gloger et al. | |

FOREIGN PATENT DOCUMENTS

| | | |
|---|---|---|
| DE | 10 2008 061 749 A1 | 6/2009 |
| DE | 10 2010 010 912 A1 | 12/2010 |

OTHER PUBLICATIONS

"Panoramic Scene Generation from Multi-view Images with Close Foreground Objects", Lee, et al., Signal Processing Lab., School of Electrical Engineering and INMC, Seoul National University, Korea, School of Electrical and Computer Engineering, UNIST, Korea, School of Electrical Engineering, Korea University Korea, $28^{th}$ Picture Coding Symposium, PCS2010, Dec. 8-10, 2010 Nagoya, Japan, XP-031885213 (Four (4) pages).

Corresponding International Search Report dated Sep. 23, 2013 with English translation (six (6) pages).

German Search Report dated May 24, 2013 with English translation (nine (9) pages).

* cited by examiner

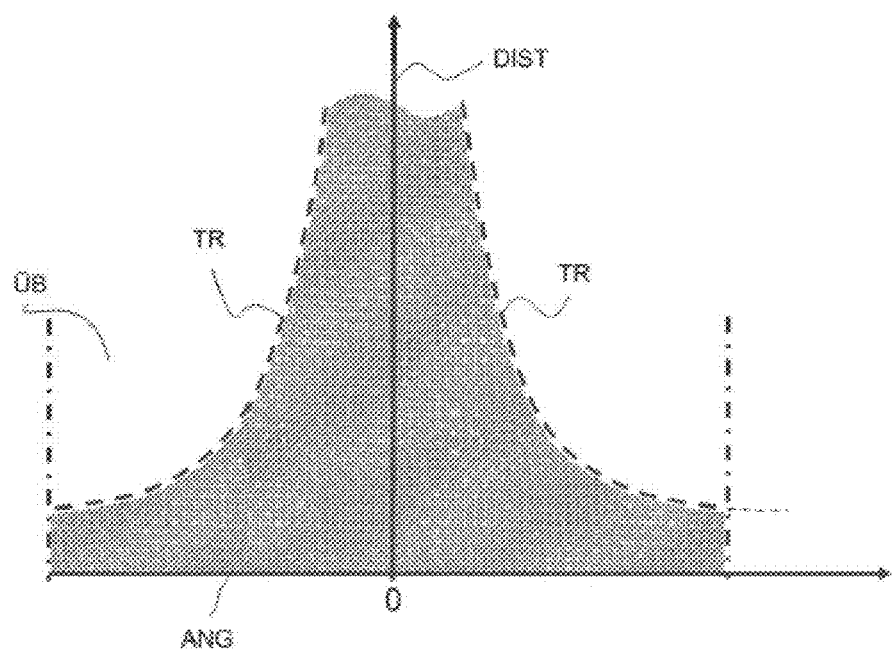

METHOD AND DEVICE FOR OPERATING A VEHICLE

CROSS REFERENCE TO RELATED APPLICATIONS

This application is a continuation of PCT International Application No. PCT/EP2013/066046, filed Jul. 31, 2013, which claims priority under 35 U.S.C. §119 from German Patent Application No. 10 2012 215 026.9, filed Aug. 23, 2012, the entire disclosures of which are herein expressly incorporated by reference.

BACKGROUND AND SUMMARY OF THE INVENTION

The invention relates to a method and a device for operating a vehicle which includes a first and a second camera.

Vehicles often include two side mirrors and one rearview mirror, by means of which a vehicle driver can obtain an overview of the surroundings of the vehicle. To this end, the vehicle driver looks into the side or rearview mirror in each case or looks over his shoulder.

US 2008/0253685 A1 discloses a method in which a plurality of images from different positions or angles are combined and linked such that, after combining and linking, a much larger panoramic image is produced.

The object underlying the invention is that of developing a method and a corresponding device for establishing an image which represents a surrounding region around a vehicle to a vehicle driver in a convenient manner.

This and other objects are achieved by a method, and corresponding device, for operating a vehicle, which includes a first and a second camera that are designed to capture an area surrounding the vehicle. The first camera has a first field of view, captures a first individual image of the first field of view, and provides first image data of the first individual image. The second camera has a second field of view, which overlaps the first field of view in an overlapping region, captures a second individual image of the second field of view, and provides second image data of the second individual image. An object correction is performed as a function of the first and second image data, including: respectively determining a distance of objects imaged in the second individual image from a predetermined reference point; respectively determining an angle of a respective object in relation to a predetermined reference axis; determining, on the basis of the determined distance and the determined angle of the respective object, whether the respective object is situated in the overlapping region and, should it be determined that the respective object is in the overlapping region, removing the respective object from the second individual image. An overall image is determined after performing the object correction, which overall image is composed as a function of the first individual image and the second individual image.

The invention is distinguished by a method and by a corresponding device for operating a vehicle. The vehicle includes a first and a second camera that are designed to capture an area surrounding the vehicle. The first camera has a first field of view. The first camera registers a first individual image of the first field of view. First image data of the first individual image are provided. The second camera has a second field of view, which overlaps the first field of view in an overlapping region. The second camera captures a second individual image of the second field of view and provides second image data of the second individual image.

An object correction is performed as a function of the first and second image data. In the object correction, a distance of objects imaged in the second individual image is determined from a predetermined reference point. By way of example, the objects are prominent objects which are imaged on the respective individual image, such as, for example, prominent objects in the foreground of the respective individual image, such as vehicles, pedestrians, lamps, houses or other prominent objects. It may not be necessary to determine the distance to the imaged sky or other non-prominent objects in the background. However, it may possibly also be necessary to determine the distance to imaged objects in the background, such as, for example, prominent clouds.

Moreover, an angle of the respective object is respectively determined in relation to a predetermined reference axis. It is determined, on the basis of the determined distance and the determined angle of the respective object, whether the respective object is situated in the overlapping region. If this was determined, the respective object is removed from the second individual image. After performing the object correction, an overall image is determined, which is composed as a function of the first individual image and the second individual image.

Since the respective objects in the overlapping region are imaged on both individual images, it is disadvantageous to join the two individual images as objects can be imaged twice on the overall image in this case. However, by virtue of the objects being removed from an individual image, the individual images can be composed to form an overall image, possibly in an optically clearer manner. As a result of this, a large area surrounding the vehicle is captured in one overall image and can, for example, be registered at a glance by a vehicle driver. Moreover, side mirrors of the vehicle can optionally be replaced by cameras, resulting in improved aerodynamics of the vehicle.

In accordance with one advantageous embodiment, the vehicle includes a first-side camera, which is arranged in a region of a first vehicle side. The vehicle moreover includes a second-side camera, which is arranged in a region of a second vehicle side. The vehicle moreover includes a rear camera, which is arranged in a tail-end region of the vehicle. The object correction is performed in terms of the first-side camera as second camera and the rear camera as first camera. Furthermore, the object correction is performed in terms of the second-side camera as second camera and the rear camera as first camera. Subsequently, the overall image is established after performing the object correction, which overall image is composed as a function of the respective individual images of the first-side camera, the rear camera and the second-side camera.

As a result, an even larger surrounding region than the surrounding region captured by two cameras is possibly provided in an overall image. By way of example, the vehicle driver thus possibly obtains even more information in relation to the surroundings at a glance.

In accordance with a further embodiment, the vehicle includes a first-side camera, which is arranged in a region of a first vehicle side. It includes a second-side camera, which is arranged in a region of a second vehicle side, and a rear camera, which is arranged in a tail-end region of the vehicle. The object correction is performed in terms of the first-side camera as first camera and the rear camera as second camera. Furthermore, the object correction is performed in terms of the second-side camera as first camera and the rear camera as second camera. After performing the object correction, the overall image, which is composed as a function of the respective individual images of the first-side camera, the rear camera and the second-side camera, is determined. As a result of this, the distances and angles of the objects only need to be determined in the individual image of the rear camera, which possibly reduces computational complexity.

In accordance with a further advantageous embodiment, the vehicle includes a first-side camera, which is arranged in a region of a first vehicle side. It includes a second-side camera, which is arranged in a region of a second vehicle side, and a rear camera, which is arranged in a tail-end region of the vehicle. The object correction is performed in terms of the first-side camera as first camera and the rear camera as second camera. Furthermore, the object correction is performed in terms of the second-side camera as second camera and the rear camera as first camera. After performing the object correction, the overall image, which is composed as a function of the respective individual images of the first-side camera, the rear camera and the second-side camera, is determined.

In accordance with a further advantageous embodiment, the vehicle includes a first-side camera, which is arranged in a region of a first vehicle side. It includes a second-side camera, which is arranged in a region of a second vehicle side, and it includes a rear camera, which is arranged in a tail-end region of the vehicle. The object correction is performed in terms of the first-side camera as second camera and the rear camera as first camera. Furthermore, the object correction is performed in terms of the second-side camera as first camera and the rear camera as second camera. After performing the object correction, the overall image, which is composed as a function of the respective individual images of the first-side camera, the rear camera and the second-side camera, is determined.

In accordance with a further advantageous embodiment, the overall image covers a field of view of at least approximately 180°. By covering such a large field of view, it may be possible to completely dispense with side and rearview mirrors. The vehicle driver can obtain an overview of the surroundings of the vehicle by virtue of looking at the overall image. It may even be possible to dispense with looking over one's shoulder.

In accordance with a further advantageous embodiment, the vehicle includes distance sensors, which are designed to detect the distance of the vehicle from object points in the surroundings of the vehicle. The distance from the respective object is determined as a function of measurement values from the distance sensors. If the vehicle already includes distance sensors, which it requires for other purposes such as, for example, a parking aid, it is easy and possibly cost-effectively possible to detect the distances from the respective object.

In accordance with a further advantageous embodiment, the distance from the respective object is determined as a function of the image data from the first and/or the second camera by use of triangulation. As a result of this, it is optionally possible to establish the distance to individual objects relatively precisely.

In accordance with a further advantageous embodiment, at least the first and/or the second camera is designed as a stereo camera. As a result of this, it is optionally easily possible to determine the distance of the objects by triangulating the stereo camera images.

In accordance with a further advantageous embodiment, if at least one object lies both within the overlapping image region and outside of the overlapping region, a transition region of the overall image is adapted by way of an image transform. The transition region is characteristic for the region of the overall image in which image contents of the first individual image are adjacent to image contents of the second individual image. The transition region is adapted by the image transform in such a way that respective edges, which correspond to one another, of the object lying both within the overlapping region and outside of the overlapping region merge into one another in the transition region. As a result of this, the overall image can optionally be displayed more clearly to the vehicle driver.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 9 is a further graph of angle and distance of objects.

DETAILED DESCRIPTION OF THE DRAWINGS

Elements with the same structure or function have been denoted by the same reference signs in all of the figures.

In a first exemplary embodiment, a vehicle 1 includes a first-side camera KAM_L and a rear camera KAM_H that are designed to capture (image) a surrounding region around the vehicle 1. The first-side camera KAM_L has a first-side field of view SF_L and the rear camera KAM_H has a tail-end field of view SF_H. The fields of view of the two cameras overlap in an overlapping region ÜB. The overlapping region ÜB is delimited by a separation plane TR. The separation plane TR is preferably arranged at the edge of one field of view, such as, for example, the first-side field of view SF_L.

Moreover, a control unit SV, which includes a computer unit, data and program memory and a communication interface, is arranged in the vehicle 1. The control unit SV can be embodied as one unit. However, it can also be embodied in a manner distributed among two or more units arranged in the vehicle 1. The control unit SV is coupled to the cameras in such a way that it can receive image data therefrom.

Figure 1:
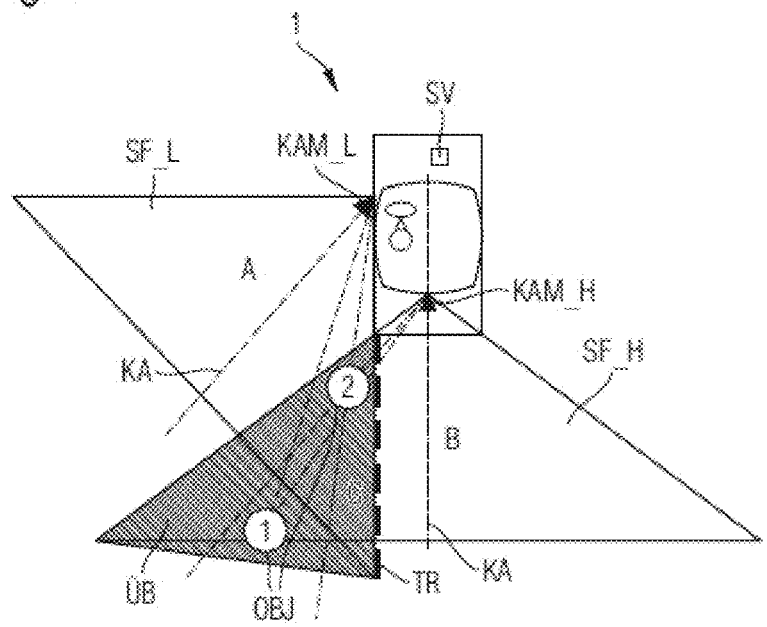
FIG. 1 is a schematic diagram showing a vehicle with two cameras.
Figure 3:
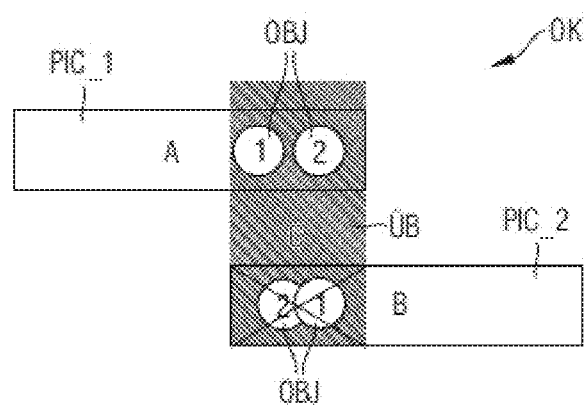
FIG. 3 is an illustration of an object correction.

In the following text, an object correction OK, which can be processed on the computer unit of the control unit SV, is described in more detail on the basis of FIG. 1 and FIG. 3. The object correction OK can be performed in terms of the first-side camera KAM_L as a first camera and the rear camera KAM_H as a second camera. Alternatively, it can be performed in terms of the first-side camera KAM_L as second camera and the rear camera KAM_H as first camera.

The first camera registers a first individual image PIC_1 of a first field of view. The second camera registers a second individual image PIC_2 of a second field of view. The object correction OK is established as a function of first image data from the first individual image PIC_1 and second image data from the second individual image PIC_2, which are respectively provided by the first and the second camera.

A distance DIST from a predetermined reference point is established from objects OBJ imaged in the second individual image PIC_2. By way of example, the distance DIST is determined by use of distance sensors, which are designed for detecting the distance of the vehicle 1 from object points in the surroundings of the vehicle 1. Alternatively or additionally, the distance DIST can be determined by way of triangulation, for example as a function of the image data from the first and/or the second camera. Since the fields of view of the two cameras overlap in the overlapping region ÜB, distances DIST of objects OBJ can be established for the overlapping region ÜB by triangulation. Alternatively or additionally, the first camera and/or the second camera can also be designed as a stereo camera. By way of example, it is advantageous if the second camera is designed as a stereo camera.

By way of example, the reference point is the origin of the second camera or the vehicle 1. In addition to the distance DIST, an angle ANG of the respective object OBJ is respectively determined in relation to a predetermined reference axis KA. By way of example, the reference axis KA is a camera axis of the second camera. By way of example, the camera axis is a normal through the center point of the sensor surface.

As a function of the established distance DIST and the established angle ANG of the respective object OBJ, it is now possible to determine whether the respective object OBJ is situated in the overlapping region ÜB. Should this be determined, the respective object OBJ is removed from the second individual image PIC_2.

After performing the object correction OK, an overall image is determined, which is composed as a function of the first individual image PIC_1 and the second individual image PIC_2.

Figure 2:
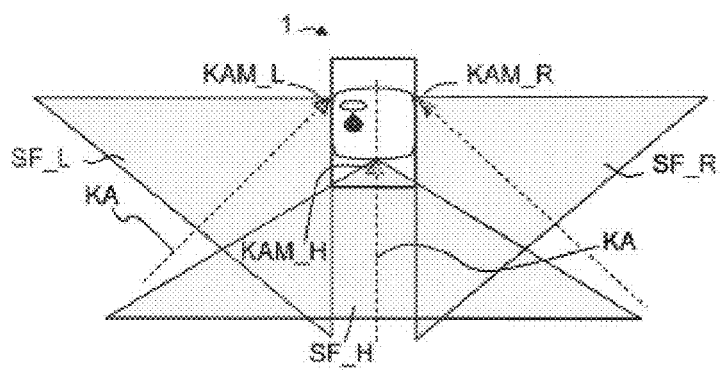
FIG. 2 is a schematic diagram showing a vehicle with three cameras.

In a second exemplary embodiment (FIG. 2), the vehicle 1 additionally includes a second-side camera KAM_R, the field of view SF_R of which partly overlaps the tail-end field of view SF_H of the rear camera KAM_H. In this case, for example, the object correction OK is performed in terms of the first-side camera KAM_L as second camera and the rear camera KAM_H as first camera. Furthermore, the object correction OK is performed in terms of the second-side camera KAM_R as second camera and the rear camera KAM_H as first camera. After performing the object correction OK, the overall image is composed as a function of the respective individual images of the first-side camera KAM_L, the rear camera KAM_H and the second-side camera KAM_R.

Alternatively, it is also possible for the object correction OK to be performed in terms of the first-side camera KAM_L as first camera and the rear camera KAM_H as second camera, and furthermore in terms of the second-side camera KAM_R as first camera and the rear camera KAM_H as second camera.

Alternatively, it is possible for the object correction OK to be performed in terms of the first-side camera KAM_L as first camera and the rear camera KAM_H as second camera, and furthermore in terms of the second-side camera KAM_R as second camera and the rear camera KAM_H as first camera.

Alternatively, it is possible for the object correction OK to be performed in terms of the first-side camera KAM_L as second camera and the rear camera KAM_H as first camera, and furthermore in terms of the second-side camera KAM_R as first camera and the rear camera KAM_H as second camera.

It is advantageous if each camera respectively has a large field of view. This is because the vehicle driver thus has an improved overview of the vehicle surroundings. Thus, for example, it is advantageous if the overall image covers at least approximately a field of view of 180°. Moreover, it is advantageous if the tail-end field of view SF_H of the rear camera KAM_H is very large, for example larger than approximately 120°. This is because it would otherwise not be possible to register regions at the edge of the tail of the vehicle 1 (see FIG. 2).

Figure 4:
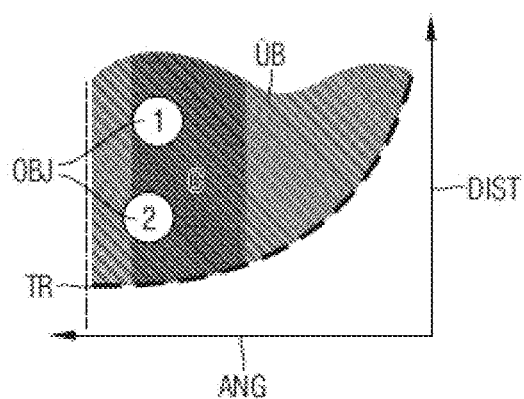
FIG. 4 is a graph of angle and distance of objects.

FIG. 9 and FIG. 4 elucidate the relationship between distance DIST and angle ANG of the objects OBJ. The separation plane TR is a function of distance DIST and angle ANG. If, in terms of angle ANG and distance DIST, an object OBJ lies on the side of the separation plane TR defining the overlapping region ÜB, the object OBJ is removed from the second individual image PIC_2. If it lies on the other side, the object OBJ is kept.

Figure 5:
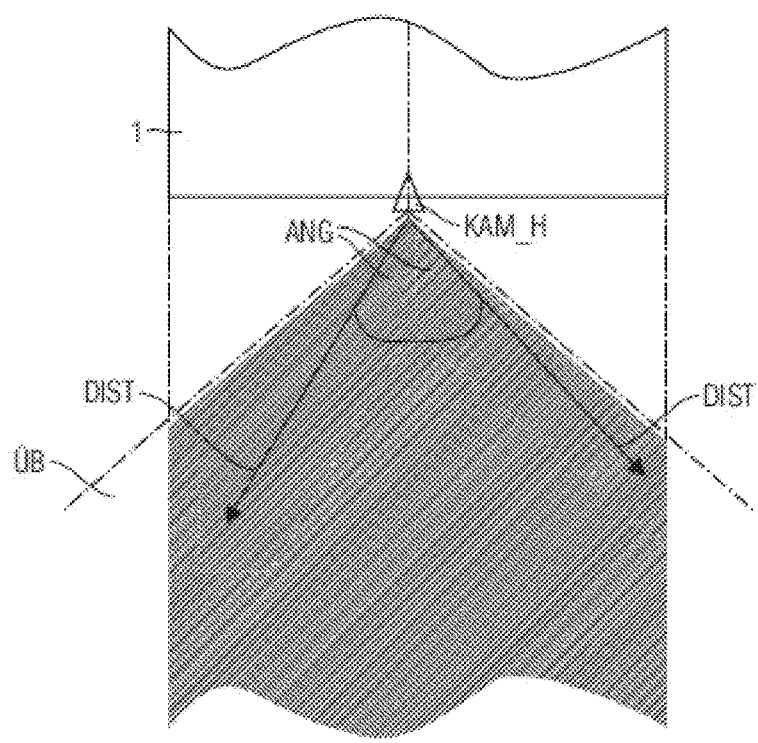
FIG. 5 is a view of a field of view.

FIG. 5 moreover defines the distance DIST of objects OBJ from the camera origin. Moreover, the overlapping region ÜB and the non-overlapping region are elucidated.

Figure 6:
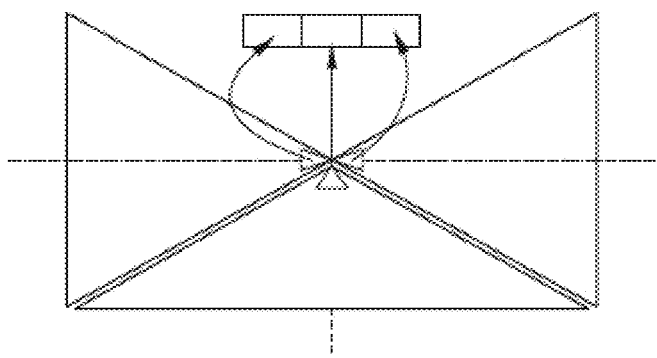
FIG. 6 is a schematic diagram showing three cameras with the same position.

FIG. 6 shows how, for example, three camera images can be combined to form an overall image. Here, the peculiarity is that the camera images were in each case recorded at different angles ANG but from the same position. As a result, it is easily possible to combine the images. The problem of the cameras in the vehicle 1 not being generally fastened at the same position can be solved by way of the object correction OK.

Figure 7:
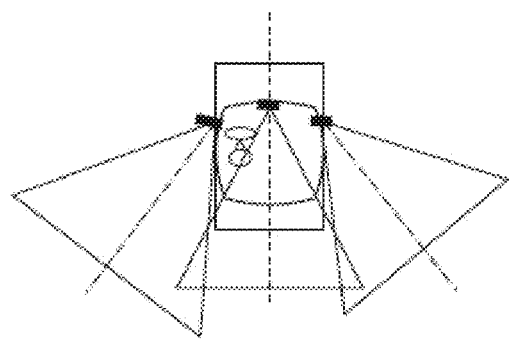
FIG. 7 is a schematic diagram showing a vehicle with two side mirrors and one rearview mirror.

FIG. 7 shows a further vehicle with two side mirrors and one rearview mirror. In order to obtain an overview of the vehicle surroundings, the driver must turn his head to each mirror individually and, additionally, in order to have an overview of the blind spots, look over his left shoulder and his right shoulder.

Figure 8:
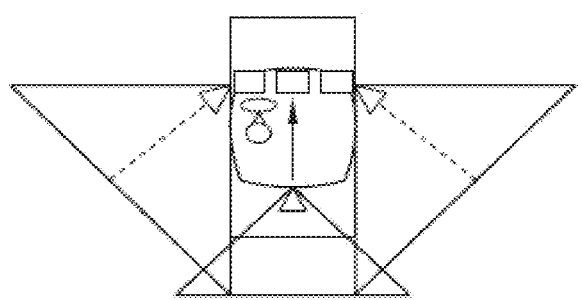
FIG. 8 is a schematic diagram showing a vehicle with three cameras and three screens.

FIG. 8 shows a further vehicle with three cameras. A display is assigned to each camera. The displays are respectively configured to image camera images of the camera assigned thereto. In order to obtain an overall overview of the vehicle surroundings, the driver must in this case also at least look into each display screen individually and cannot register the overall image by virtue of only looking at one display screen, as would be possible if an overall image were to be established as a function of the individual images of the cameras.

If an object OBJ lies both within the overlapping region ÜB and outside of the overlapping region ÜB, a transition region of the overall image, which is characteristic for the region of the overall image in which image contents of the first individual image PIC_1 are adjacent to image contents of the second individual image PIC_2, can be adapted by use of an image transform. This is brought about in such a way that respective edges, which correspond to one another, of the object OBJ lying both within the overlapping region ÜB and outside of the overlapping region ÜB, merge into one another in the transition region.

LIST OF REFERENCE SIGNS

1 Vehicle
KAM_L First-side camera
KAM_H Rear camera
KAM_R Second-side camera
SF_L First-side field of view
SF_H Tail-end field of view
SF_R Second-side field of view
PIC_1 First individual image
PIC_2 Second individual image
ÜB Overlapping region
OBJ Object
OK Object correction
KA Reference axis
TR Separation plane
DIST Distance
ANG Angle
SV Control Unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a vehicle equipped with first and second cameras configured to capture an area surrounding the vehicle, the first camera having a first field of view, capturing a first individual image of the first field of view, and providing first image data of the first individual image, and the second camera having a second field of view overlapping the first field of view in an overlap region, capturing a second individual image of the second field of view, and providing second image data of the second individual image, the method comprising the acts of:
    performing an object correction as a function of the first and second image data, the performing of the object correction comprising the acts of:
        (i) determining, respectively, a distance of objects imaged in the second individual image from a predetermined reference point;
        (ii) determining, respectively, an angle of a respective object in relation to a predetermined reference axis;
        (iii) determining, based on the determined distance and the determined angle of the respective object, whether the respective object is located in the overlap region; and
        (v) if the determined respective object is located in the overlap region, removing the respective object from the second individual image; and
    determining an overall image, after performing the object correction, wherein the overall image is composed as a function of the first individual image and the second individual image.

2. The method according to claim 1, wherein the vehicle:
    includes a first-side camera, which is arranged in a region of a first vehicle side;
    includes a second-side camera, which is arranged in a region of a second vehicle side; and
    includes a rear camera, which is arranged in a tail-end region of the vehicle, the method further comprising the acts of:
    performing the object correction in terms of the first-side camera as the second camera and the rear camera as the first camera; and
    further performing the object correction in terms of the second-side camera as the second camera and the rear camera as the first camera, and wherein the overall image is determined after performing the object correction, which overall image is composed as a function of the respective individual images of the first-side camera, the rear camera and the second-side camera.

3. The method according to claim 1, wherein the vehicle:
    includes a first-side camera, which is arranged in a region of a first vehicle side;
    includes a second-side camera, which is arranged in a region of a second vehicle side; and
    includes a rear camera, which is arranged in a tail-end region of the vehicle, the method further comprising the acts of:
    performing the object correction in terms of the first-side camera as the first camera and the rear camera as the second camera;
    further performing the object correction in terms of the second-side camera as the first camera and the rear camera as the second camera, and wherein the overall image is determined after performing the object correction, which overall image is composed as a function of the respective individual images of the first-side camera, the rear camera and the second-side camera.

4. The method according to claim 1, wherein the vehicle:
    includes a first-side camera, which is arranged in a region of a first vehicle side;
    includes a second-side camera, which is arranged in a region of a second vehicle side; and
    includes a rear camera, which is arranged in a tail-end region of the vehicle, the method further comprising the acts of:
    performing the object correction in terms of the first-side camera as the first camera and the rear camera as the second camera; and
    further performing the object correction in terms of the second-side camera as the second camera and the rear camera as the first camera, and wherein the overall image is determined after performing the object correction, which overall image is composed as a function of the respective individual images of the first-side camera, the rear camera and the second-side camera.

5. The method according to claim 1, wherein the vehicle:
    includes a first-side camera, which is arranged in a region of a first vehicle side;
    includes a second-side camera, which is arranged in a region of a second vehicle side; and
    includes a rear camera, which is arranged in a tail-end region of the vehicle, the method further comprising the acts of:
    performing the object correction in terms of the first-side camera as the second camera and the rear camera as the first camera; and
    further performing the object correction in terms of the second-side camera as the first camera and the rear camera as the second camera, and wherein the overall image is determined after performing the object correction, which overall image is composed as a function of the respective individual images of the first-side camera, the rear camera and the second-side camera.

6. The method according to claim 1, wherein the overall image covers a field of view of at least approximately 180°.

7. The method according to claim 1, wherein:
    the vehicle includes distance sensors, which are configured to detect a distance of the vehicle from object points in the area surrounding the vehicle, and the distance from the respective object is established as a function of measurement values from the distance sensors.

8. The method according to claim 1, further comprising the act of determining the distance from the respective object as a function of image data from the first and/or the second camera by way of triangulation.

9. The method according to claim 8, wherein at least the first and/or the second camera is a stereo camera.

10. The method according to claim 1, wherein at least the first and/or the second camera is a stereo camera.

11. The method according to claim 1, further comprising the acts of:
  - determining if at least one object lies both within the overlap region and outside of the overlap region;
  - if the object lies both within and outside of the overlap region, adapting a transition region of the overall image, which transition region is characteristic for a region of the overall image in which image contents of the first individual image are adjacent to image contents of the second individual image, by way of an image transform so that respective edges, which correspond to one another, of the object lying both within and outside of the overlap region, merge into one another in the transition region.

12. A vehicle, comprising:
  - a first camera configured to capture images of an area surrounding the vehicle, the first camera having a first field of view, capturing a first individual image of the first field of view, and providing first image data of the first individual image;
  - a second camera configured to capture an area surrounding the vehicle, the second camera having a second field of view, capturing the second individual image of the second field of view, which second field of view overlaps the first field of view in an overlap region, and providing second image data of the second individual image; and
  - a control unit coupled to receive the provided first and second image data, the control unit executing an object correction program that:
  - determines, respectively, a distance from objects imaged in the second individual image from a predetermined reference point;
  - determines, respectively, an angle of a respective object in relation to a predetermined reference axis;
  - determines, based on the determined distance and angle of the respective object, whether the respective object is located in the overlap region;
  - removes the respective object from the second individual image when the respective object is determined to be in the overlap region; and
  - determines an overall image after performing the object correction, said overall image being composed as a function of the first individual image and the second individual image.

* * * * *